United States Patent
Oh et al.

(10) Patent No.: US 7,324,618 B2
(45) Date of Patent: Jan. 29, 2008

(54) APPARATUS AND METHOD FOR CANCELING NARROW-BAND INTERFERENCE IN A MOBILE COMMUNICATION SYSTEM

(75) Inventors: Jeong-Tae Oh, Seoul (KR); Soon-Young Yoon, Seoul (KR); Jin-Woo Choi, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 564 days.

(21) Appl. No.: 10/315,644

(22) Filed: Dec. 10, 2002

(65) Prior Publication Data

US 2003/0179840 A1    Sep. 25, 2003

(30) Foreign Application Priority Data

Dec. 10, 2001    (KR)    .................... 10-2001-0077973

(51) Int. Cl.
*H04B 1/10*    (2006.01)

(52) U.S. Cl. ...................... 375/350; 375/144; 375/148; 455/114.2; 455/278.1; 455/296

(58) Field of Classification Search ................ 375/144, 375/148, 317; 370/208; 455/306
See application file for complete search history.

(56) References Cited

U.S. PATENT DOCUMENTS 5,271,038 A * 12/1993 Cai ............................ 375/317
5,999,561 A * 12/1999 Naden et al. ................ 375/142

FOREIGN PATENT DOCUMENTS

JP    08-086448    4/1996
JP    2000-101479    4/2000

OTHER PUBLICATIONS

Pouttu, A.; Juntti, J.; Kumpumaki, T.; Adaptive transform domain interference suppression in a hybrid DS/FH-system; Sep. 2-4, 1998; 1998 IEEE 5th International Symposium on Spread Spectrum Techniques and Applications; p. 351-355.*
Rifkin, R.; Vaccaro, J.J.;Comparison of narrowband adaptive filter technologies for GPS; Mar. 13-16, 2000; IEEE 2000 Position Location and Navigation Symposium; pp. 125-131.□□.*

* cited by examiner

*Primary Examiner*—David C. Payne
*Assistant Examiner*—Adolf DSouza
(74) *Attorney, Agent, or Firm*—The Farrell Law Firm, PC

(57) ABSTRACT

An apparatus and method for canceling narrow-band interference in a wideband mobile communication system. The apparatus includes a down converter for down converting a received signal into a baseband signal, an analog-to-digital converter for converting the baseband signal into a digital signal, a decimation filter for decimating the digital signal according to a decimation ratio, an interference canceller for detecting narrow-band interference signals contained in an output of the decimation filter, and canceling the narrow-band interference signals, and a demodulator for demodulating an output of the interference canceller.

9 Claims, 5 Drawing Sheets

APPARATUS AND METHOD FOR CANCELING NARROW-BAND INTERFERENCE IN A MOBILE COMMUNICATION SYSTEM

PRIORITY

This application claims priority to an application entitled "Apparatus and Method for Canceling Narrow-Band Interference in a Mobile Communication System" filed in the Korean Industrial Property Office on Dec. 10, 2001 and assigned Serial No. 2001-77973, the contents of which are incorporated herein by reference.

BACKGROUND OF THE INVENTION

1. Field of the Invention

The present invention relates generally to a receiving apparatus and method of a wideband mobile communication system, and in particular, to an apparatus and method for canceling narrow-band interference contained in a wideband receiving signal.

2. Description of the Related Art

A mobile communication system provides a mobile terminal with a radio communication service using given radio frequency resources. However, in reality the mobile communication system experiences deterioration in performance due to interference which can be generated in radio environments, and may bring about a malfunction. Therefore, technical efforts for canceling the interference are needed.

In general, interference which is generated in the mobile communication system is broadly divided into common frequency interference and near-by frequency interference. The common frequency interference includes interference between base stations using a common (or same) frequency, and interference from other systems such as illegal radio stations. The near-by frequency interference includes interference between base stations using near-by frequencies within the same system, and interference between adjacent systems.

The worst interference in an existing wideband mobile communication system may be powerful narrow-band interference from other systems using a common frequency resource. In a mobile communication base station system, the narrow-band interference may lead to deterioration in system performance and communication interruption. Conventional methods for canceling the narrow-band interference are as follows.

A first method uses a narrow-band interference cancellation filter at an intermediate frequency band. That is, if a narrow-band interference signal is received, a fast interference signal detection receiver detects the interference signal and converts the frequency of the detected signal into an intermediate frequency. The signal converted into the intermediate frequency signal is subject to filtering to remove the intermediate signal and reconverted into the signal having an original frequency. This method has disadvantages of a large-capacity, large-sized apparatus, and relatively high power consumption.

A second method suppresses the narrow-band interference by filtering and fast Fourier transform. That is, a filter is used with respect to an interference signal having high power, and quantization, fast Fourier transform (FFT), and inverse FFT techniques are used with respect to an interference signal having low power. However, this second method is also disadvantageous in that an apparatus is complicated by using different techniques according to the power of the interference signal, and a delay time of a receiving signal is increased by performing the FFT and the inverse FFT.

A third method suppresses the narrow-band interference by using an adaptive digital filter. That is, an input signal at a carrier frequency is subject to frequency-down conversion, gain control, quantization, and conversion to a digital signal. An interference signal is detected from the digital signal. An adaptive digital IIR (Infinite Impulse Response) filter is used to eliminate the interference from the detected interference signal. However, the use of the IIR filter adaptable to the interference signal increases in complexity.

SUMMARY OF THE INVENTION

It is, therefore, an object of the present invention to provide an apparatus and method for canceling narrow-band interference from a receiving signal in order to prevent communication interruption occurring by a narrow-band interference signal in a mobile communication system.

It is another object of the present invention to provide an apparatus and method for canceling narrow-band interference at a baseband in a mobile communication system.

It is still another object of the present invention to provide an apparatus and method for canceling interference at a baseband after converting a receiving signal into a digital signal, decimating the digital signal and converting the decimated signal into a baseband signal.

According to an aspect of the present invention, there is provided a receiving apparatus of a wideband mobile communication system, including a down converter for down converting a received signal into a baseband signal, an analog-to-digital converter for converting the baseband signal into a digital signal, a decimation filter for decimating the digital signal according to a pre-selected decimation ratio, an interference canceller for detecting narrow-band interference signals contained in an output of the decimation filter, and canceling the narrow-band interference signals, and a demodulator for demodulating an output of the interference canceller.

According to another aspect of the present invention, there is provided a method for canceling narrow-band interference of a received signal in a wideband mobile communication system, including the steps of converting the received signal to a digital received signal, detecting narrow-band interference signals contained in the digital received signal and generating control signals and corresponding carrier frequencies according to the detected narrow-band interference signals, and filtering the digital received signal by the carrier frequencies in response to each of the control signals to cancel the narrow-band interference signals.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
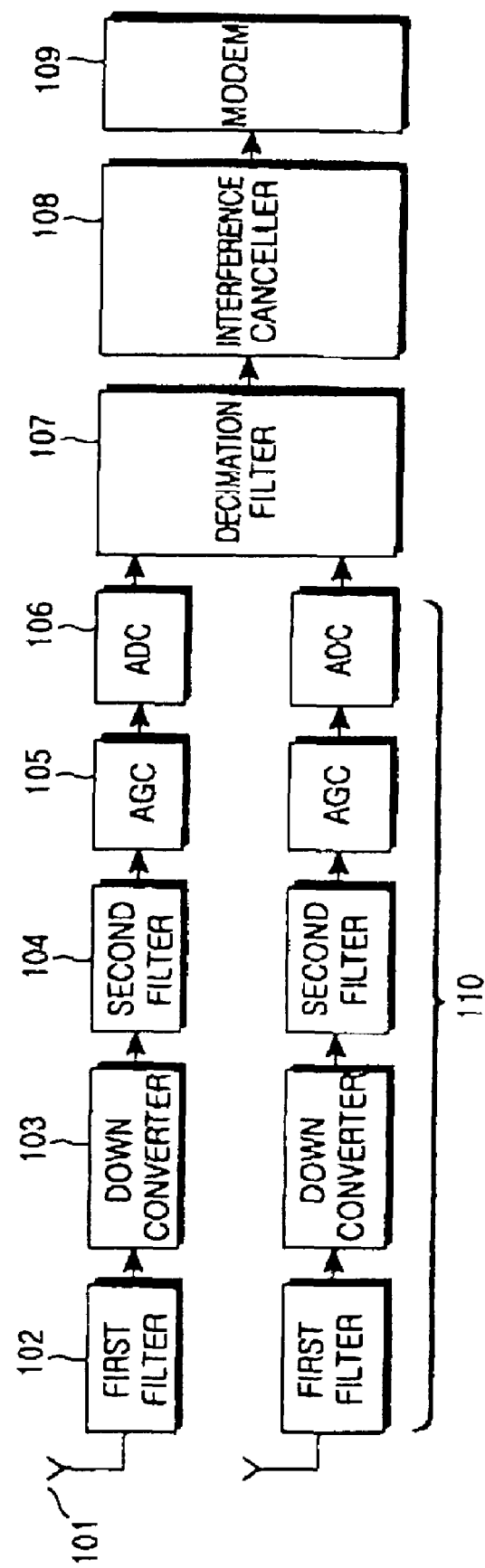
FIG. 1 is a block diagram of an apparatus for canceling a narrow-band interference signal in a mobile communication system according to a preferred embodiment of the present invention.

A preferred embodiment of the present invention will be described herein below with reference to the accompanying drawings in which like reference numerals are used to designate like elements throughout the views. In the following description, well-known functions or constructions are not described in detail since they would obscure the invention in unnecessary detail.

Referring to FIG. 1, a first filter 102 of a band pass-filter filters a signal of a desired receiving band among signals received through an antenna 101. A down converter 103 down converts the desired receiving band signal generated from the first filter 102 to output an intermediate frequency band signal. A second filter 104 filters the frequency down converted signal generated from the down converter 103. An automatic gain controller (AGC) 105 controls a gain of the signal generated from the second filter 104. An analog-to-digital converter (ADC) 106 converts the gain-controlled analog signal generated from the AGC 105 into a digital signal.

In the case where a mobile communication system performs a receiving diversity function, a plurality of receiving paths may exist from the first filter 102 to the ADC 106. FIG. 1 shows the mobile communication system in which an antenna and a receiving path are duplicated by adopting receiving diversity. The components diversity path 110 have the same function as the components of the path described above. However, although the receiving diversity is not adopted, an apparatus for canceling interference according to a preferred embodiment of the present invention can equally be used.

A decimation filter 107 decimates samples of the digitally converted signal according to a given decimation ratio. An interference canceller 108 cancels interference from the decimated signal. A modulator and demodulator (MODEM) 109 demodulates the signal generated from the interference canceller 108 and extracts information to be received.

In operation, a signal received through the antenna 101 is a radio frequency (RF) band signal. The first filter 102 approximately filters only a desired frequency band from the received RF signal. The down converter 103 down converts the RF signal filtered by the first filter 102 into a specific band signal. This is because distortion may occur in signal characteristics if the RF signal of a high frequency band is converted into a baseband signal at a time. Therefore, the frequency of the RF signal is converted into a specific band (intermediate frequency band) which is lower than its frequency band and higher than the baseband. Thereafter, the intermediate frequency band signal is converted into the baseband signal.

The second filter 104 filters the signal band-pass filtered by the first filter 102. The AGC 105 uniformly maintains the power level of the signal generated from the second filter 104. The ADC 106 converts the gain-controlled analog signal into a fast digital signal. Since the digitally converted signal has many sampled values for one original symbol, the decimation filter 107 decimates the sampled signal so that the narrow-band interference can be easily performed by the interference canceller 108. The interference canceller 108 then eliminates the narrow-band interference by use of the decimated result from the decimation filter 107. The MODEM 109 demodulates the signal generated from the interference canceller 108.

As illustrated in FIG. 1, an apparatus for canceling the narrow-band interference signal in the mobile communication system according to a preferred embodiment of the present invention converts the receiving signal into the digital signal, decimates the digitally converted signal to be converted into the baseband signal, and cancels the interference at the baseband, resulting in lower material cost and occupying less space than an apparatus using the conventional method in which the interference is canceled at the RF band or both at the RF band and at the baseband.

Figure 2:
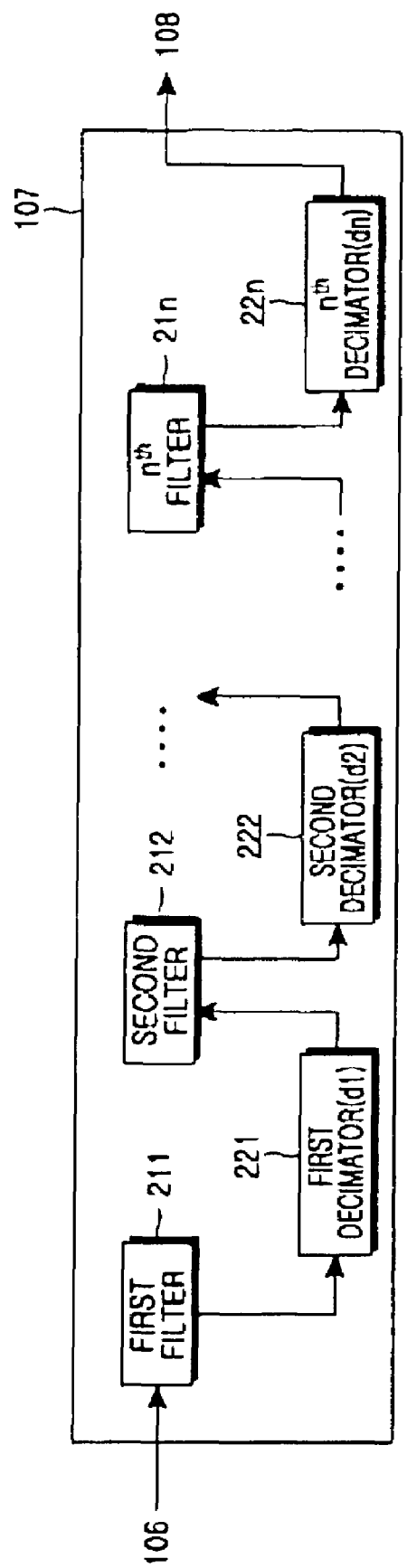
FIG. 2 is a detailed block diagram of a decimation filter illustrated in FIG. 1.

FIG. 2 shows a detailed construction of the decimation filter 107 illustrated in FIG. 1.

Referring to FIG. 2, the decimation filter 107 consists of n filters 211-21*n*, and n decimators 221-22*n*. The filters 211-21*n* and the decimators 221-22*n* are serially connected to each other in an interlaced form. In other words, an output stage of the filter 211 is connected to the decimator 221, and the decimator 221 decimates samples generated from the filter 211 according to a preset decimation ratio d1. An output stage of the decimator 221 is connected to the next filter 212, an output stage of the filter 212 is connected to the next decimator 222, and the decimator 222 decimates samples generated from the filter 212 according to a preset decimation ratio d2. Similarly, the remaining filters up to 21*n* are serially connected to the remaining decimators up to 22*n*. In the same way, the filters 211-21*n* are connected to the decimators 221-22*n* in an interlaced form to perform the decimation function.

In a CDMA (Code Division Multiple Access) system where the signal generated from the ADC 106 is comprised of 64 samples per chip and the decimation ratios d1, d2 and d3 of three decimators are 8, 2 and 3, respectively, since a decimator performs the decimation function at a ratio of d1=8, the number of samples generated from the decimator is decreased to 8 (=64/8). Therefore, the final number of samples generated through the three decimators is 2 (64/8/2/2) per chip. Thus the decimation ratios d1-dn of the decimators 221-22*n* are designed so as to be suitable for the number of samples generated from the ADC 106 and the number of samples input to the interference canceller 108.

In FIG. 2, the signal input to the first filter 211 is the output signal of the ADC 106. The first filter 211 previously corrects an error generated in the process of decimating samples in the first decimator 221. An output signal of the first filter 211 is applied to the first decimator 221, and the first decimator 221 performs an operation of reducing the number of samples of its input signal at the decimation ratio d1. In like manner, the filters 211-21*n* and the decimators 221-22*n* reduce the number of samples of the digitally converted signal.

Figure 3:
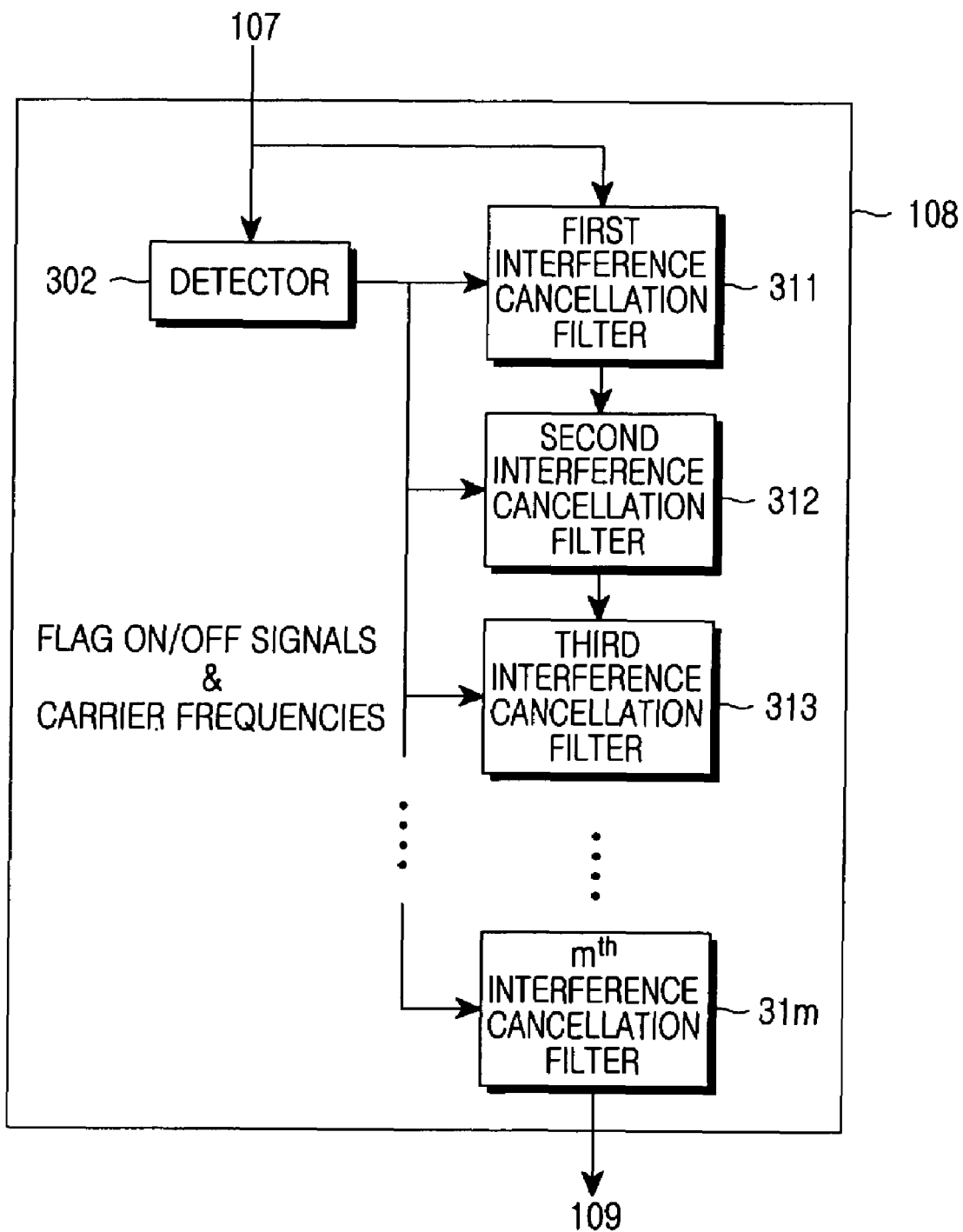
FIG. 3 is a detailed block diagram of an interference canceller illustrated in FIG. 1.

FIG. 3 shows a detailed construction of the interference canceller 108 illustrated in FIG. 1, for canceling the narrow-band interference contained in the digitally converted signal at the baseband according to a preferred embodiment of the present invention.

Referring to FIG. 3, the signal input to the interference canceller 108 is the output signal of the decimation filter 107, and it is simultaneously applied to a detector 302 and a first interference cancellation filter 311. The first cancellation filter 311 is serially connected to the other interference cancellation filters 312-31*m*. The interference cancellation filters 311-31*m* operate under the control of the detector 302.

The detector 302 detects presence or absence of the narrow-band interference signal from the signal received from the decimation filter 107, and detects the number of the narrow-band interference signals. The detector 302 also determines carrier frequencies of the detected narrow-band interference signals. The detector 302 generates control information depending on the presence/absence of the narrow-band interference signals, and provides the interference cancellation filters 311-31m with the control information and the carrier frequencies. The control information produced by the detector 302 includes flag ON and OFF signals for respectively enabling and disabling the operation of each of the interference cancellation filters 311-3 1m.

Each of the interference cancellation filters 311-31m receives the flag ON or OFF signal from the detector 302. If the flag ON signal is received, the corresponding interference cancellation filter operates, and if the flag OFF signal is received, the corresponding interference cancellation filter does not operate and the input signal is bypassed.

For example, if it is determined that the signal input to the interference canceller 108 includes the narrow-band interference comprised of (m-3) narrow-band interference frequency signals (that is, interference spectra), the detector 302 provides the interference cancellation filters 311-(31m-3) with the flag ON signal and the carrier frequency of each of the narrow-band interference signals, and provides the other interference cancellation filters (31m-2)-31m with the flag OFF signal.

Upon receipt of the flag ON signal and the carrier frequencies from the detector 302, the interference cancellation filters 311-(31m-3) calculate coefficients for interference cancellation filtering based on the carrier frequencies of the corresponding narrow-band interference signals generated from the detector 302, and perform filtering based on the calculated coefficients. Thus, each of the interference cancellation filters 311-(31m-3) cancels the corresponding one narrow-band interference signal. The other interference cancellation filters (31m-2)-31m which have received the flag OFF signal from the detector 302 do not perform the filtering operation and bypass the input signals.

If the number of the interference cancellation filters constituting the interference canceller 108 is less than the number of the narrow-band interference signals of the input signal, the narrow-band interference signals are sequentially cancelled in order of high energy level by using the interference cancellation filters.

Figure 4:
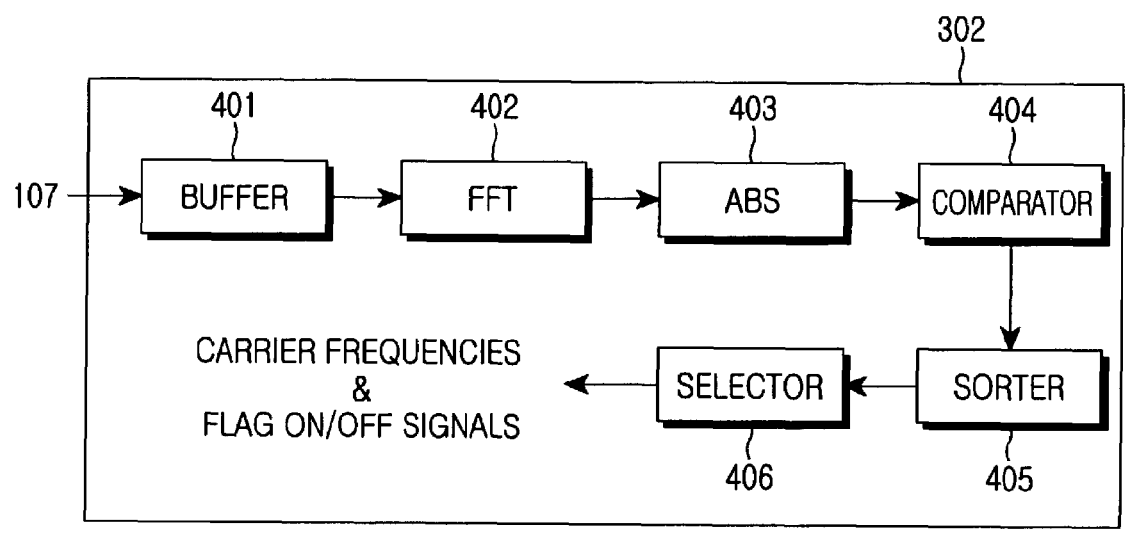
FIG. 4 is a detailed block diagram of a detector illustrated in FIG. 3.

FIG. 4 illustrates a detailed construction of the detector 302 constituting the interference canceller 108 illustrated in FIG. 3.

Referring to FIG. 4, a buffer 401 stores a signal of a prescribed interval generated from the decimation filter 107. A fast Fourier Transformer (FFT) 402 fast-Fourier-transforms a signal generated from the buffer 401. An absolute calculator (ABS) 403 calculates an absolute value of the fast-Fourier-transformed signal, that is, an energy level. A comparator 404 compares the calculated absolute value with a given threshold value and outputs signals having the absolute values larger than the threshold value. The threshold value is set to detect an interference frequency signal having relatively high energy level in comparison with a desired receiving signal. That is, the signals generated from the comparator 404 are regarded as interference signals.

A sorter 405 sorts the signals generated from the comparator 404 in order of energy level. A selector 406 selects a maximum of m candidates according to the number m of the interference cancellation filters among the signals generated from the sorter 405, and outputs the flag ON signal and carrier frequencies for the candidates.

In operation, the buffer 401 stores samples generated from the decimation filter 107 during a prescribed interval. The FFT 402 fast-Fourier-transforms the samples stored in the buffer 401 and outputs frequency signals of a prescribed number. The ABS 403 calculates the absolute values of the fast-Fourier-transformed frequency signals and converts the transformed frequency signals into energy components. The comparator 404 compares the absolute values calculated from the ABS 403 with the preset threshold value and outputs the signals having the absolute value larger than the threshold value.

The sorter 405 sorts the signals generated from the comparator 404 in order of energy level, and the selector 406 selects a maximum of m candidates in order of energy level among the signals sorted by the sorter 405. If the number of the signals generated from the comparator 404 is less than m, all the signals are selected. The selector 406 provides the flag ON/OFF signals and the carrier frequencies corresponding to the selected signals to the interference cancellation filters 311-31m by using the selected candidates. That is, the flag ON signal and the carrier frequencies of the selected signals are provided to the interference cancellation filters as many as the number of the selected signals. The carrier frequency can be known depending on frequency resolution and on when the selected signal is generated from the FFT 402 in order of output.

Figure 5:
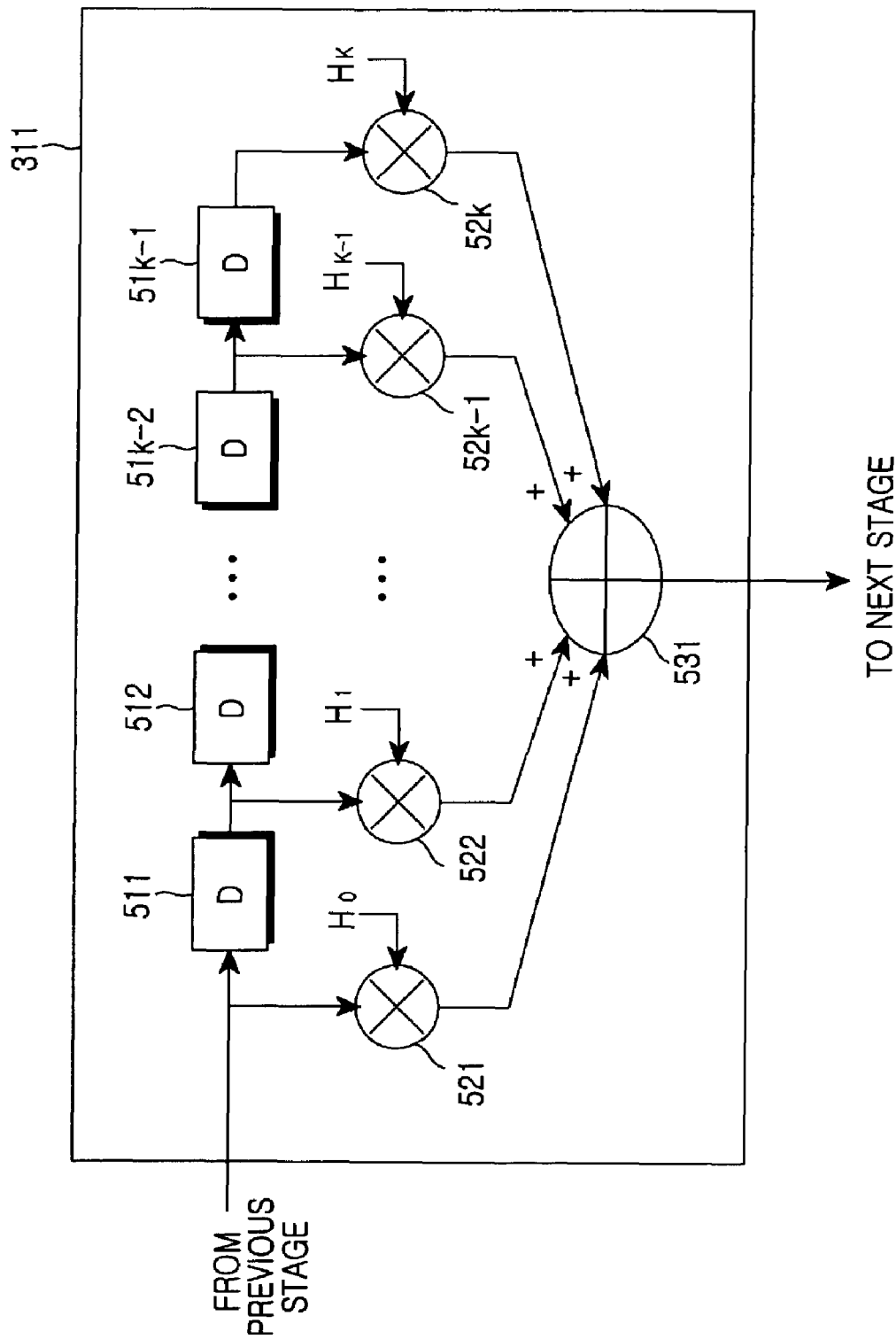
FIG. 5 is a detailed block diagram of an interference cancellation filter illustrated in FIG. 3.

FIG. 5 illustrates a detailed construction of each of the interference cancellation filters 311-31m constituting the interference canceller 108 shown in FIG. 3. Although FIG. 5 shows the first interference cancellation filter 311, each of the other interference cancellation filters 312-31m has the same construction.

Referring to FIG. 5, the interference cancellation filter 311 is comprised of a finite impulse response (FIR) filter. The FIR filter has (k-1) latches 511(51k-1), k multipliers 521-52k, and an adder 531. A signal input to the interference cancellation filter 311 is applied to the first latch 511 and simultaneously it is multiplied by a filtering coefficient $H_0$ at the first multiplier 521. A signal latched by the latch 511 is applied to the next latch 512 and simultaneously multiplied by a filtering coefficient $H_1$ at the multiplier 522. Similarly, a signal latched by the last latch 51k-1 is multiplied by a filtering coefficient $H_k$ at the last multiplier 52k. Output signals of the multipliers 521-52k are all added to each other at the adder 531 and an output signal of the adder 531 is input to the next interference cancellation filter.

The filtering coefficients $H_0$-$H_k$ shown in FIG. 5 are determined so as to cancel only the narrow-band interference signal having the corresponding carrier frequency among the input signals. Since a method for obtaining the filtering coefficients is well known to those skilled in the art, an additional description thereof is not given.

As described above, the analog receiving signal is converted into the fast digital signal, and the digitally converted signal is converted into the baseband signal through the decimation filter. The narrow-band interference signal is canceled from the baseband signal. Therefore, the mobile communication system can obtain superior interference cancellation performance with low material cost and little space.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A receiving apparatus of a wideband mobile communication system, comprising:
   a down converter for down converting a received signal into a baseband signal;
   an analog-to-digital converter for converting the baseband signal into a digital signal;
   a decimation filter for decimating the digital signal according to a pre-selected decimation ratio;
   an interference canceller for detecting narrow-band interference signals contained in a digital output of the decimation filter and canceling the narrow-band interference signals, comprising:
      a detector for detecting the narrow-band interference signals contained in the output of the decimation filter, and generating control signals and corresponding carrier frequencies according to the detected narrow-band interference signals, comprising:
         a fast Fourier transformer (FFT) for fast-Fourier-transforming the output of the decimation filter;
         a comparator for comparing energy levels of the fast-Fourier-transformed signals with a threshold value, and identifying signals having an energy level greater than the threshold value to be the narrow-band interference signals;
         a sorter for sorting the narrow-band interference signals generated from the comparator in order of energy level; and
         a selector for selecting the narrow-band interference signals in order of high energy level among the sorted narrow-band interference signals, and generating the carrier frequencies corresponding to the selected narrow-band interference signals; and
      at least one interference cancellation filter for operating in response to each of the control signals, and canceling the narrow-band interference signals contained in the output of the decimation filter by the carrier frequencies; and
   a demodulator for demodulating an output of the interference canceller.

2. The receiving apparatus of claim 1, wherein the selector selects the narrow-band interference signals as many as the number of the interference cancellation filters among the sorted signals.

3. The receiving apparatus of claim 1, wherein each of the interference cancellation filters is a finite impulse response (FIR) filter.

4. The receiving apparatus of claim 1, wherein the decimation filter has at least two filters and at least one decimators connected in alternating series, and each of the decimators has a pre-selected decimation ratio.

5. An apparatus for canceling narrow-band interference of a received signal in a wideband mobile communication system, comprising:
   an analog-to-digital converter for converting the received signal to a digital received signal;
   a detector for detecting narrow-band interference signals contained in the digital received signal, and generating control signals and corresponding carrier frequencies according to the detected narrow-band interference signals, comprising:
      a fast Fourier transformer (FFT) for fast-Fourier-transforming the digital received signal;
      a comparator for comparing energy levels of the fast-Fourier-transformed signals with a threshold value, and identifying signals having an energy level greater than the threshold value to be the narrow-band interference signals;
      a sorter for sorting the narrow-band interference signals generated from the comparator in order of energy level; and
      a selector for selecting the narrow-band interference signals in order of high energy level among the sorted narrow-band interference signals, and generating the carrier frequencies corresponding to the selected narrow-band interference signals; and
   at least one interference cancellation filters for filtering the digital received signal by the carrier frequencies in response to each of the control signals to cancel the narrow-band interference signals contained in the digital received signal.

6. The apparatus of claim 5, wherein the selector selects the narrow-band interference signals as many as the number of the interference cancellation filters among the arranged signals.

7. The apparatus of claim 5, wherein each of the interference cancellation filters is a finite impulse response (FIR) filter.

8. A method for canceling narrow-band interference of a received signal in a wideband mobile communication system, comprising the steps of:
   converting the received signal to a digital received signal;
   detecting narrow-band interference signals contained in the digital received signal, and generating control signals and corresponding carrier frequencies according to the detected narrow-band interference signals, comprising:
      fast-Fourier-transforming the digital received signal;
      comparing energy levels of the of fast-Fourier-transformed signals with a threshold value, and identifying the signals having an energy level greater than the threshold value to be the narrow-band interference signals;
      sorting the narrow-band interference signals in order of energy level; and
      selecting the narrow-band interference signals in order of high energy level among the sorted narrow-band interference signals, and generating the carrier frequencies corresponding to the selected narrow-band interference signals; and
   filtering the digital received signal by the carrier frequencies in response to each of the control signals to cancel the narrow-band interference signals.

9. The method of claim 8, wherein the filtering step comprises the step of filtering the digital received signal with finite impulse response (FIR) filters.

* * * * *